United States Patent
Hara et al.

(10) Patent No.: US 6,920,170 B2
(45) Date of Patent: *Jul. 19, 2005

(54) ORTHOGONALLY EXCITED-TYPE LASER OSCILLATOR

(75) Inventors: Shoichiro Hara, Tokyo (JP); Koji Funaoka, Tokyo (JP); Takao Ohara, Tokyo (JP); Satoshi Nishida, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 182 days.

This patent is subject to a terminal disclaimer.

(21) Appl. No.: 10/278,932

(22) Filed: Oct. 24, 2002

(65) Prior Publication Data

US 2003/0193985 A1 Oct. 16, 2003

(30) Foreign Application Priority Data

Apr. 11, 2002 (JP) .................................... 2002-109694

(51) Int. Cl.⁷ ................................................ H01S 3/08
(52) U.S. Cl. ................ 372/107; 372/34; 372/58; 372/61; 372/65; 372/92; 372/109
(58) Field of Search .............................. 372/34, 58, 61, 372/65, 92, 107, 109

(56) References Cited

U.S. PATENT DOCUMENTS 5,596,597 A * 1/1997 Nishida et al. ............. 372/107

FOREIGN PATENT DOCUMENTS

| JP | SHO 61-199685 | 9/1986 |
| JP | SHO 63-50083 | 3/1988 |
| JP | HEI 5-206544 | 8/1993 |
| JP | HEI 7-111352 | 4/1995 |
| JP | 2000-183425 | 6/2000 |

* cited by examiner

*Primary Examiner*—Minsun Oh Harvey
*Assistant Examiner*—Cornelius H Jackson
(74) *Attorney, Agent, or Firm*—Burns, Doane, Swecker & Mathis, LLP

(57) ABSTRACT

Plate springs as coupling members can absorb deformation of an oscillator case due to heat and do not transmit the deformation to two optical bases constituting an optical resonator, and it is thereby possible to maintain an appropriate positional relation between the optical cases. A harmful deformation force is produced due to imperfect alignment deformation of bellows each of which is connected between the oscillator case and each optical base. The plate springs can also suppress the force acting on the two optical bases, and it is thereby possible to keep a laser optical axis of a laser beam to be a fixed position.

8 Claims, 12 Drawing Sheets

ORTHOGONALLY EXCITED-TYPE LASER OSCILLATOR

BACKGROUND OF THE INVENTION

1) Field of the Invention

The present invention relates to an orthogonally excited-type laser oscillator which has a structure capable of stably maintaining the output of a laser beam and the quality of a beam mode, by keeping a constant positional relation such as parallelism or imperfect alignment of a pair of optical resonators even if an oscillator case is deformed due to heat.

2) Description of the Related Art

A gas laser oscillator generally includes a discharge tube filled with laser gas to excite the laser by discharging, and an optical resonator having two mirrors disposed on opposite sides of this tube. When a large amount of heat is produced in the tube when the laser is oscillated, a part of the heat is transmitted to the optical resonator or a base plate which supports the discharge tube or the optical resonator. These devices are deformed by heat, which results in causing a disorder in the parallelism of the pair of optical bases constituting the optical resonator, or positional displacement between the axis of the optical resonator and the axis of the oscillator case. Further, the optical resonator itself causes a difference in the thermal expansion between components, such as a bar of an end plate of a flame, relative to each other due to a change of the outside temperature. This may also cause positional displacement of the optical resonator. The displacement of the optical resonator brings about a disorder in the mirror alignment, to thereby make the laser output and the beam mode unstable. Therefore, in order to cope with the positional displacement of the optical resonator due to the influence of heat, laser oscillators having various constructions have been proposed.

As the invention relating to the conventional laser oscillator, there is a conventional art disclosed in Japanese Patent Application Laid-Open No. 2000-183425 shown in FIG. 12. In this conventional art, a front optical base 9 and a rear optical base 7 are disposed on the opposite sides of an oscillator case 1. A partial reflection mirror is fixed to the front optical base 9 and a total reflection mirror is fixed to the rear optical base 7. The front optical base 9 and the rear optical base 7 are firmly connected with each other by support rods 112 to 114 extending in the traveling direction (in the direction of optical axis) of three laser beams, one in the lower part and two in the upper part, so that the partial reflection mirror and the total reflection mirror are fixed parallel with each other on the same optical axis. The support rods 113 and 114 on the upper side of the oscillator case 1 are connected to the central portion in the direction of the optical axis on the upper face of the oscillator case 1 with the axially central portion being connected by brackets 120 and 121, respectively. The support rod 113 located on a blower side where there is little thermal deformation is perfectly fixed to the oscillator case 1 by the bracket 120, while the support rod 114 located on the other side at a high temperature is movably connected to the oscillator case 1 by the bracket 121 provided on a slide base 122 whose axial movement and vertical movement are restricted. That is, the bracket 121 can slide on the slide base 122 in the left and right direction as shown by the arrow. The support rod 112 in the lower part is not connected to the oscillator case 1 by a bracket, but only the opposite ends of the support rod 112 are fixed to the optical bases 9 and 7. The portions where the laser beam passes between the oscillator case 1 and the rear optical base 7, and between the oscillator case 1 and the front optical base 9 are connected by bellows, respectively.

In the above-described conventional art, it is possible to suppress a change in the positional relation between the two optical bases 7 and 9 due to a temperature distribution of the laser medium gas, by the support structure using the three support rods 112 to 114 and the brackets 120 and 121. However, since the oscillator case 1 thermally deforms freely due to the temperature distribution of the laser medium gas, the position or the angle at the opposite ends thereof changes. As a result, the positions of the bellows fitted to the opposite ends of the oscillator case 1 change. Generally, the rigidity of the bellows in the deviation direction of the core is very large as compared to the axial rigidity, and a harmful reaction force occurs by the positional displacement of the bellows. By this reaction force, the structure of the optical resonator is deformed, thereby the positional relation between the two optical bases 9 and 7 collapses. Such positional displacement between the optical bases 9 and 7 makes the laser output or the beam mode unstable.

SUMMARY OF THE INVENTION

It is an object of this invention to obtain an orthogonally excited-type laser oscillator capable of preventing an optical resonator formed with two optical bases arranged parallel to each other and with support rods from being affected by a deformation force, even if an oscillator case is thermally deformed.

The orthogonally excited-type laser oscillator according to this invention includes an oscillator case, and a pair of optical bases which are installed on opposite sides of the oscillator case and connected parallel with each other by at least three support rods extending in a direction of optical axis, and which respectively support optical parts constituting an optical resonator. The oscillator also includes a pair of bellows which connects the pair of optical bases with the oscillator case, and coupling members each of which couples a side end of the oscillator case to each optical base when a direction of optical axis of the optical resonator is Y axis, a height direction perpendicular to the direction of optical axis is Z axis, and a direction perpendicular to the Y axis and the Z axis is X axis. Each central position of the bellows connected to the optical bases restricts a bending movement in the directions of X axis and Z axis and a rotation about the Y axis, with respect to the central position of the bellows connected to the side ends of the oscillator case, but allows a bending movement in the direction of Y axis and a rotation movement about the X axis and Z axis.

Therefore, the coupling members can absorb the deformation of the oscillator case and do not transmit the deformation to the optical bases. Thus, the appropriate positional relation between the optical cases can be maintained.

These and other objects, features and advantages of the present invention are specifically set forth in or will become apparent from the following detailed descriptions of the invention when read in conjunction with the accompanying drawings.

DETAILED DESCRIPTION

Embodiments of the orthogonally excited-type laser oscillator according to this invention will be explained in detail with reference to the accompanying drawings.

Figure 1:
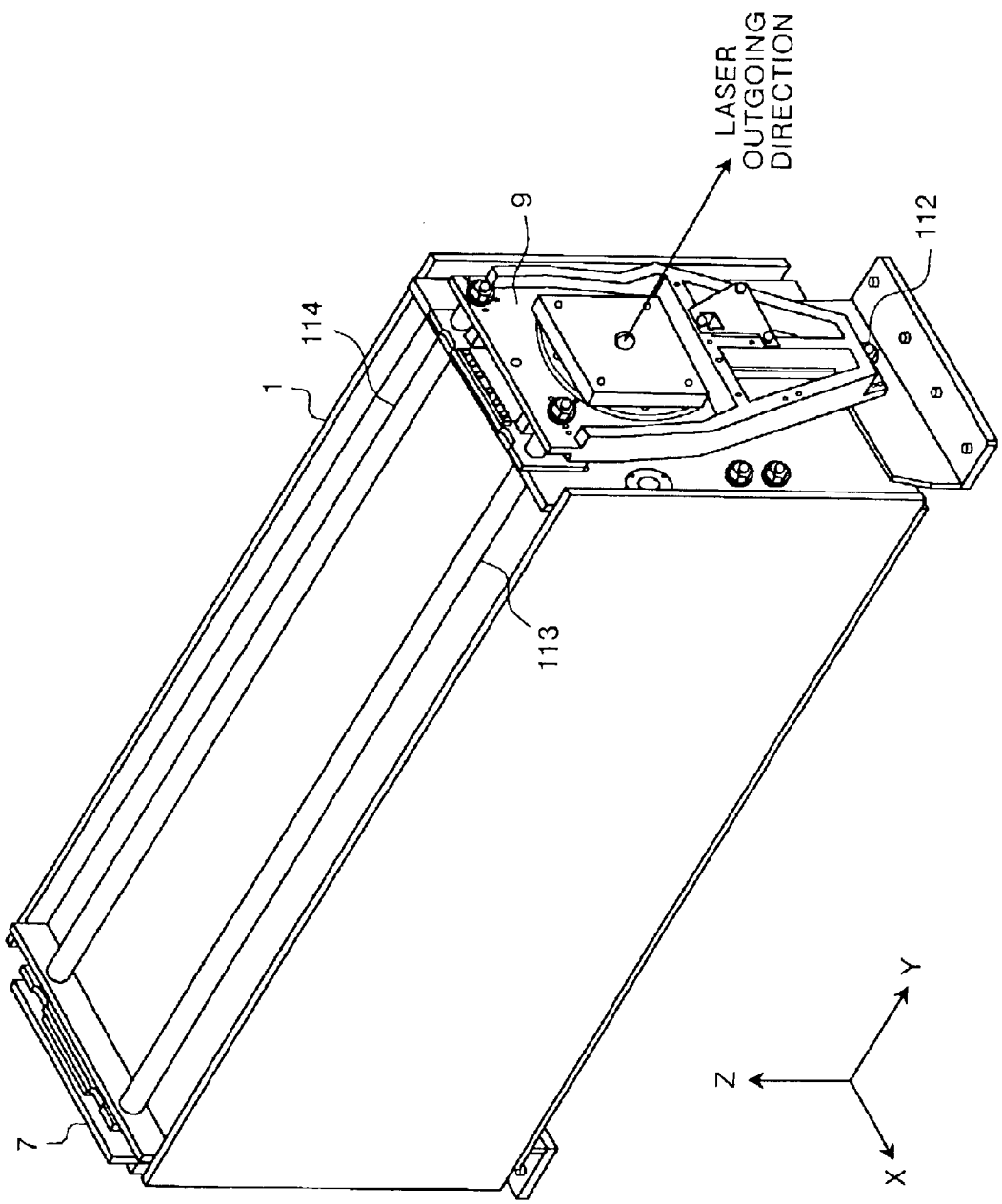
FIG. 1 is a perspective view which shows the whole of an orthogonally excited-type laser oscillator according to a first embodiment of this invention.
Figure 2:
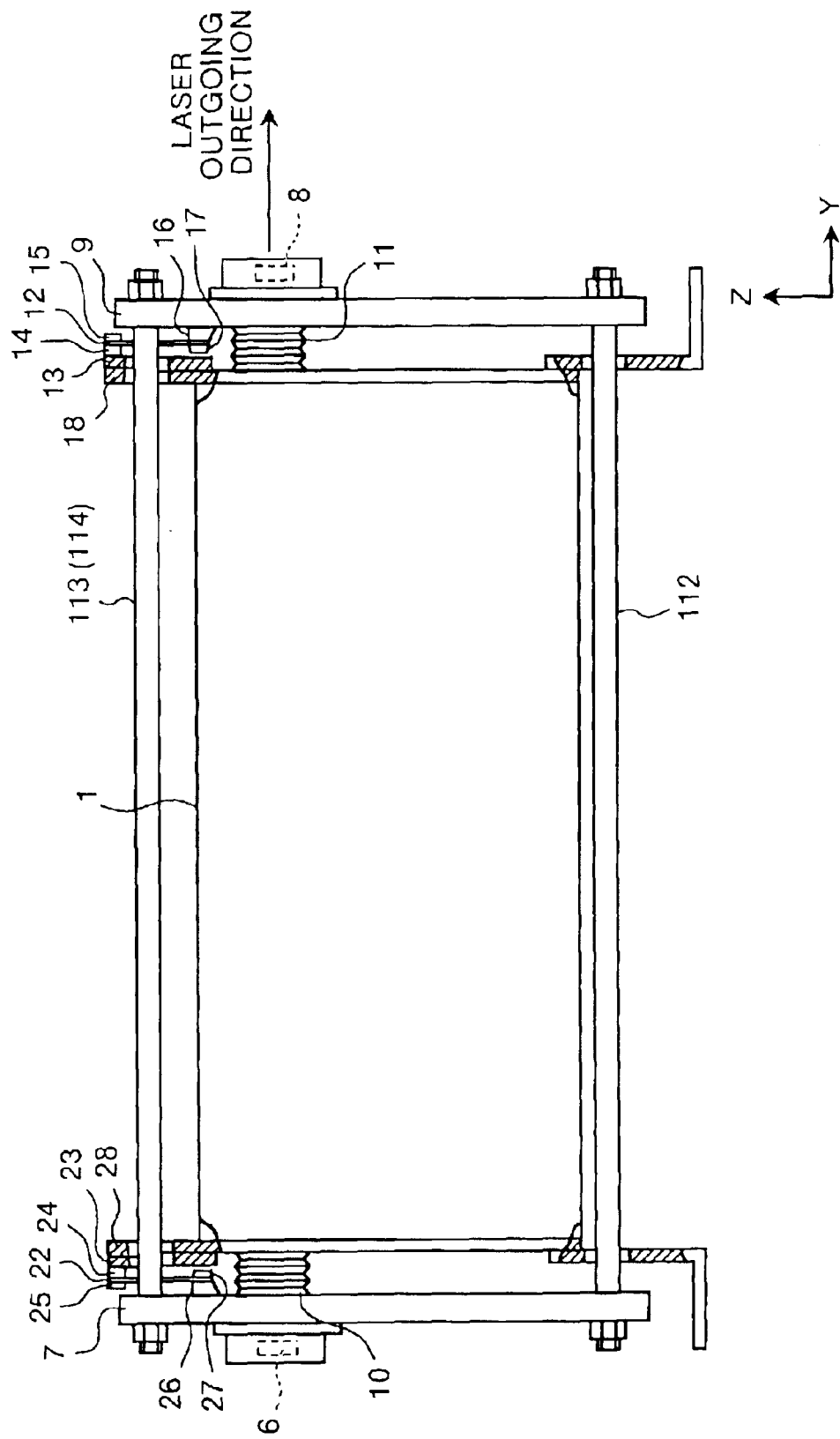
FIG. 2 is a front view of the oscillator according to the first embodiment.
Figure 3:
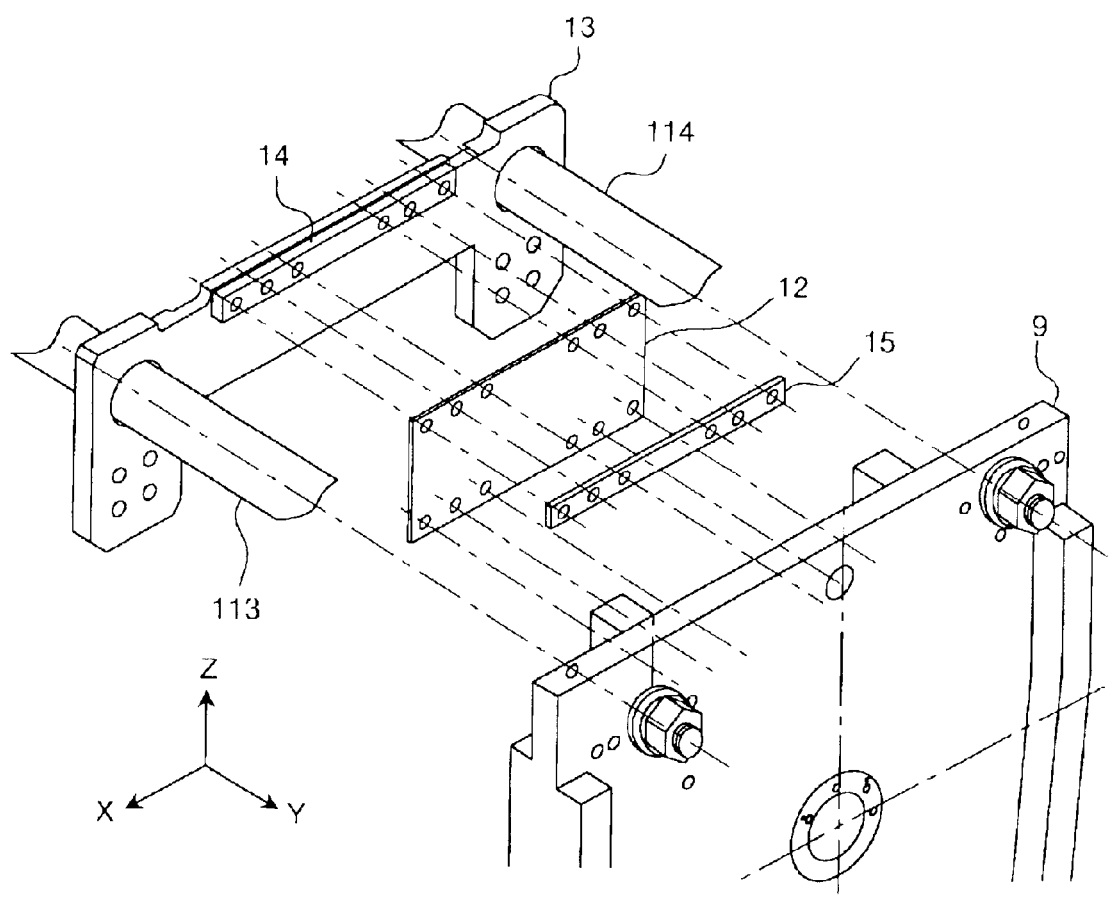
FIG. 3 is a perspective view which shows how coupling members are coupled in the oscillator according to the first embodiment.
Figure 4:
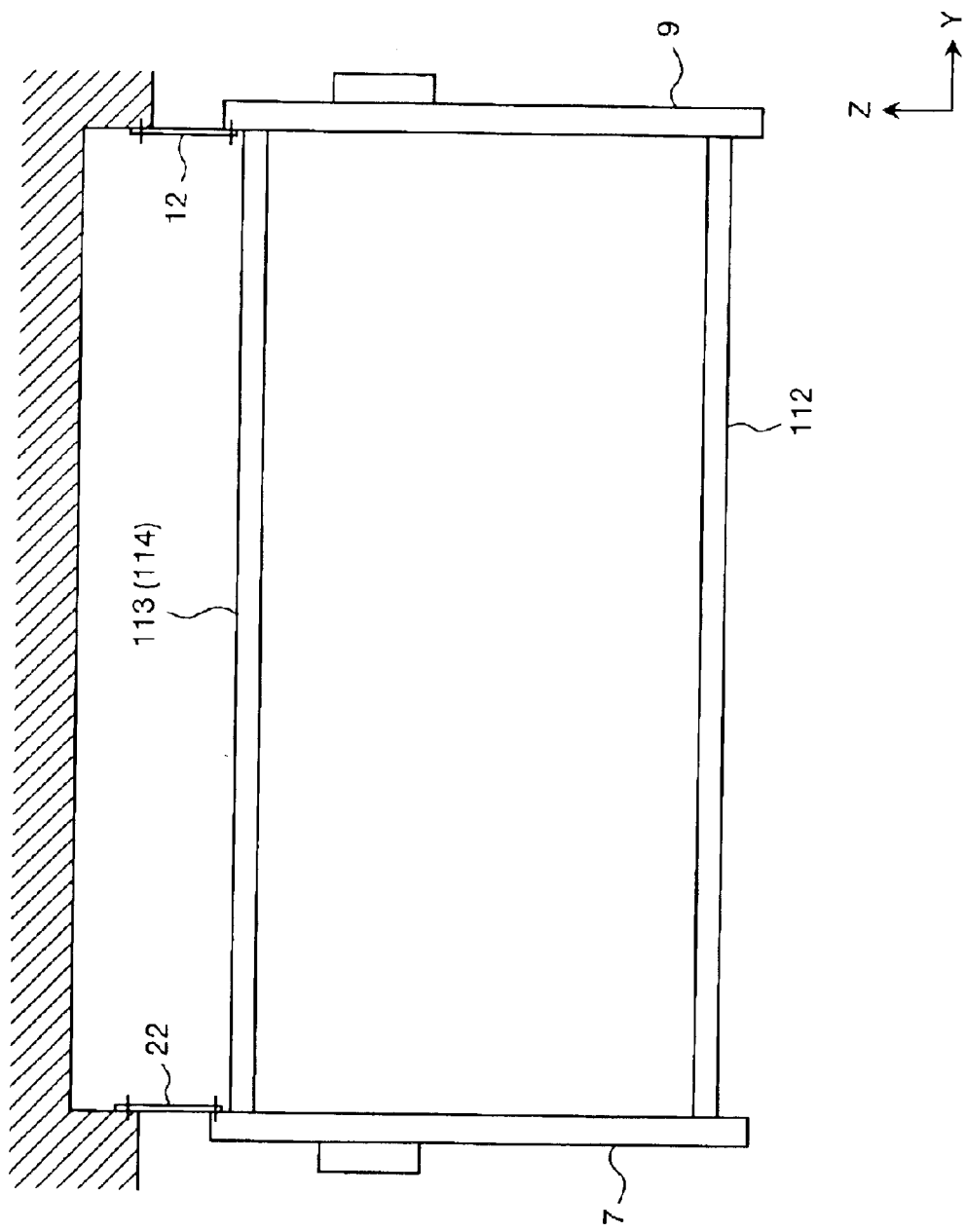
FIG. 4 is a diagram which shows a relation between an oscillator case and optical bases in the oscillator according to the first embodiment.
Figure 5:
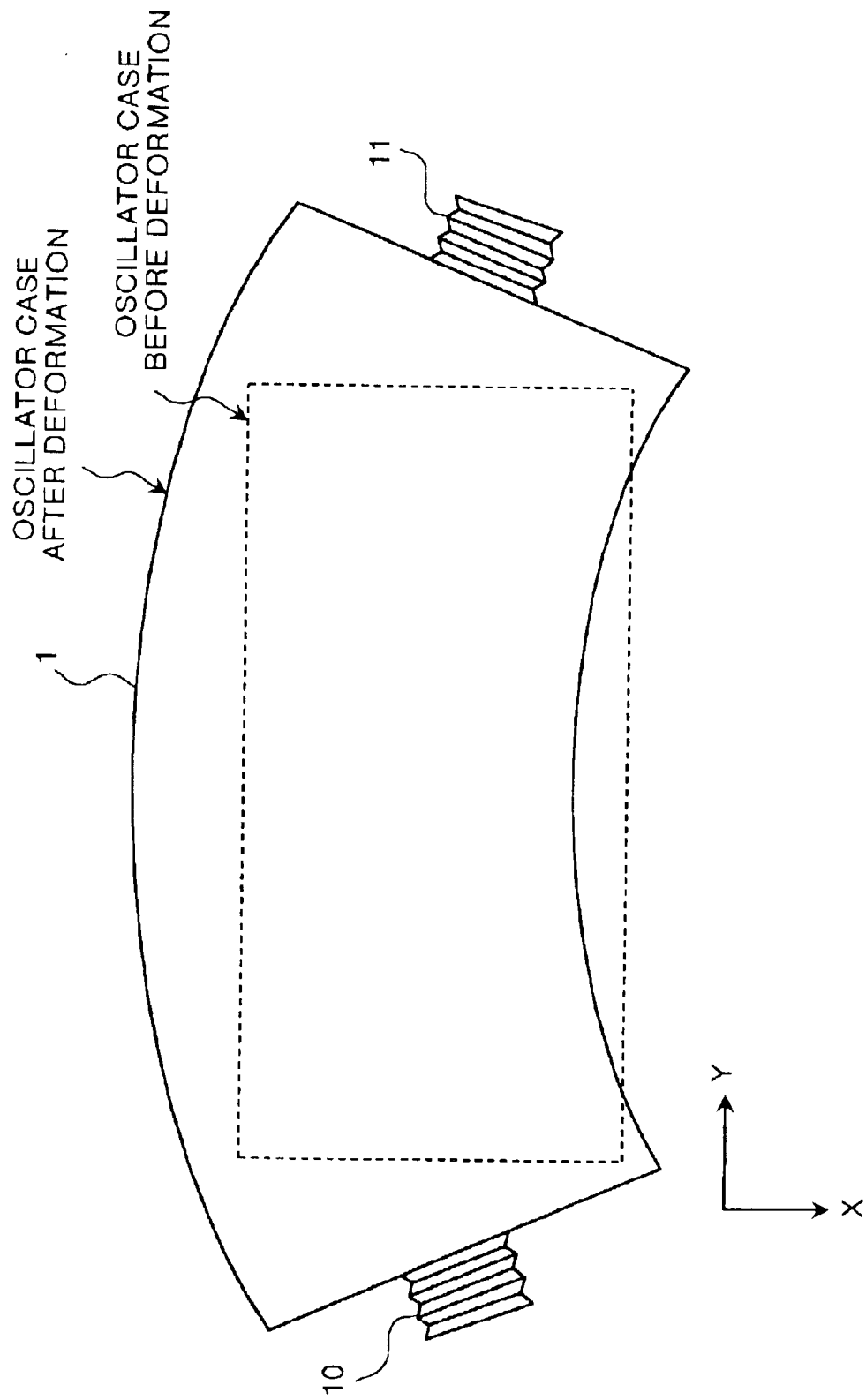
FIG. 5 is a plan view which shows the thermally deformed oscillator case.
Figure 6:
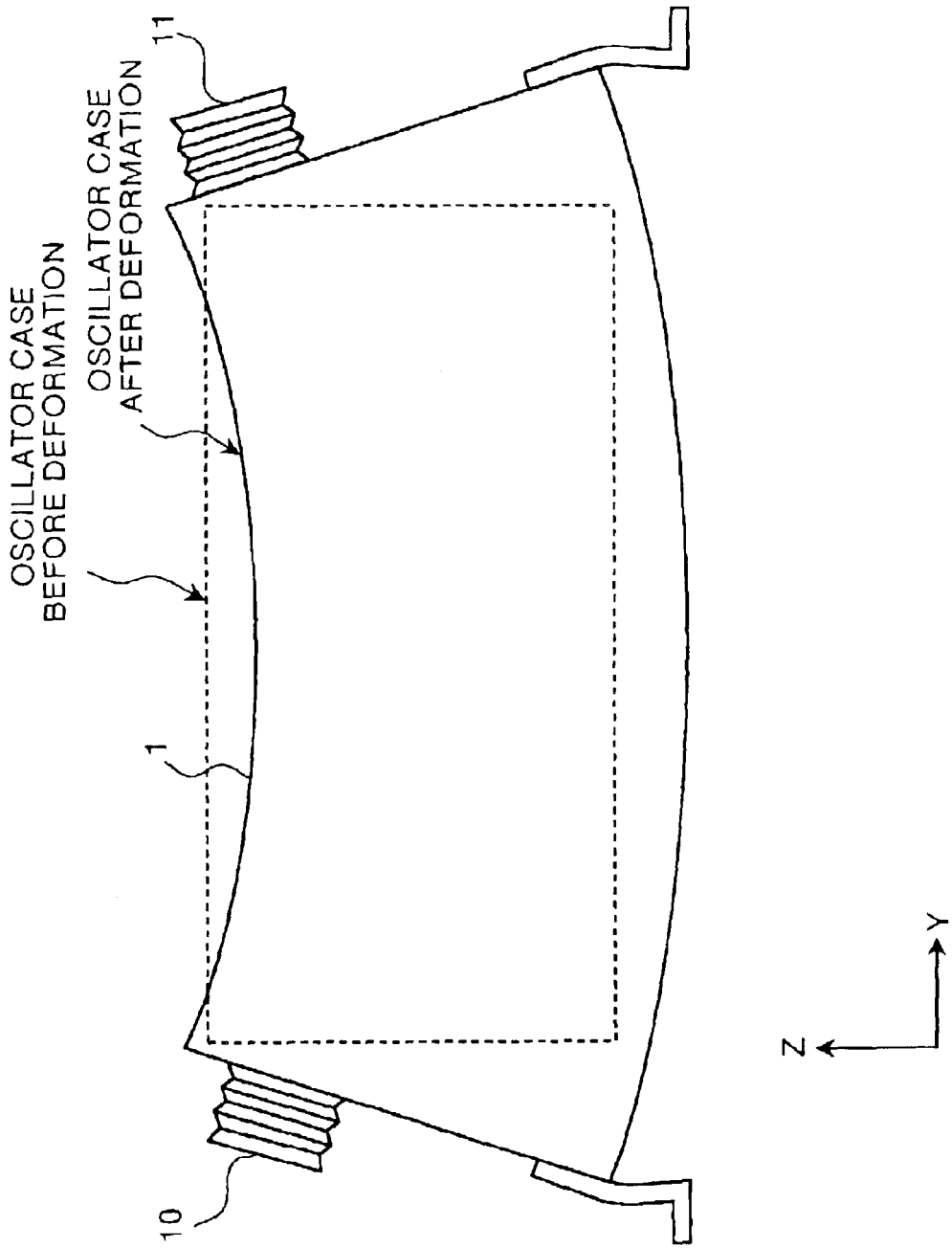
FIG. 6 is a front view which shows the thermally deformed oscillator case.
Figure 7:
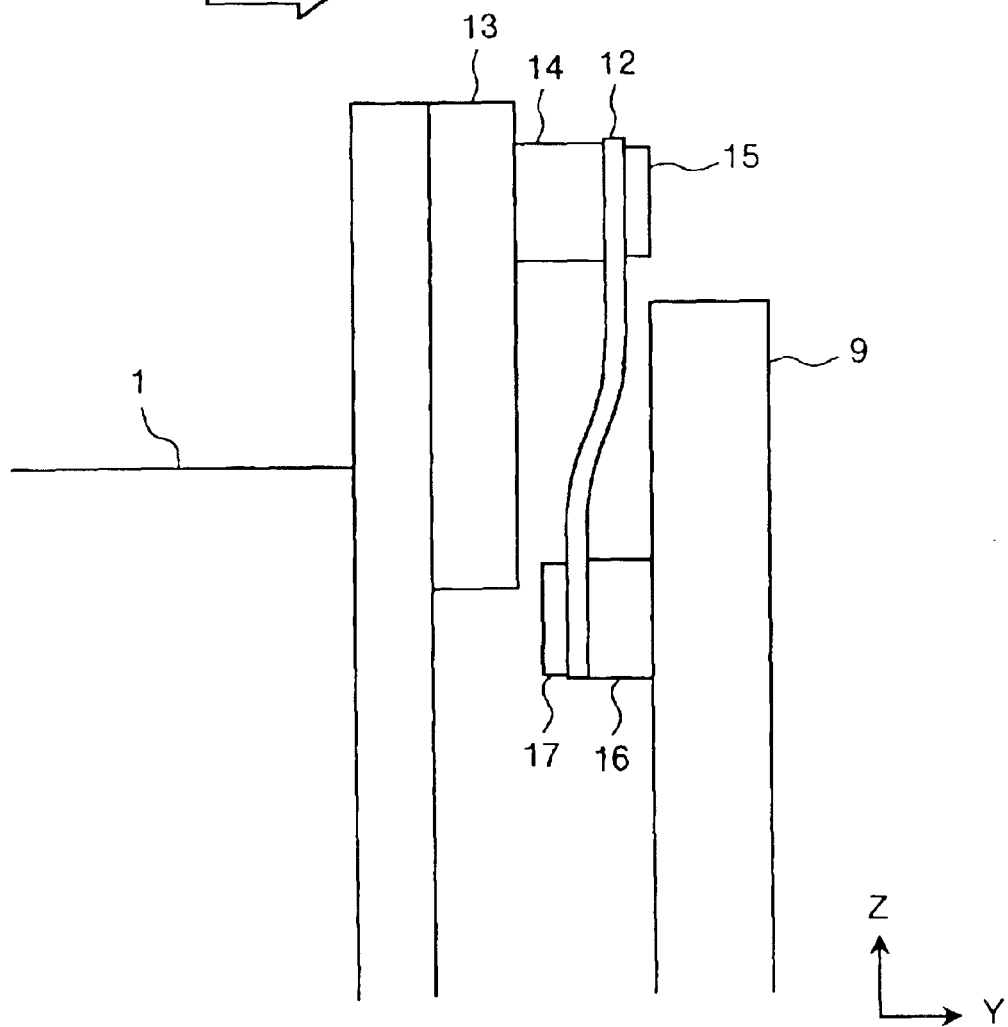
FIG. 7 is a diagram which shows the deformed appearance of the coupling member due to bending in the direction of Y axis.
Figure 8:
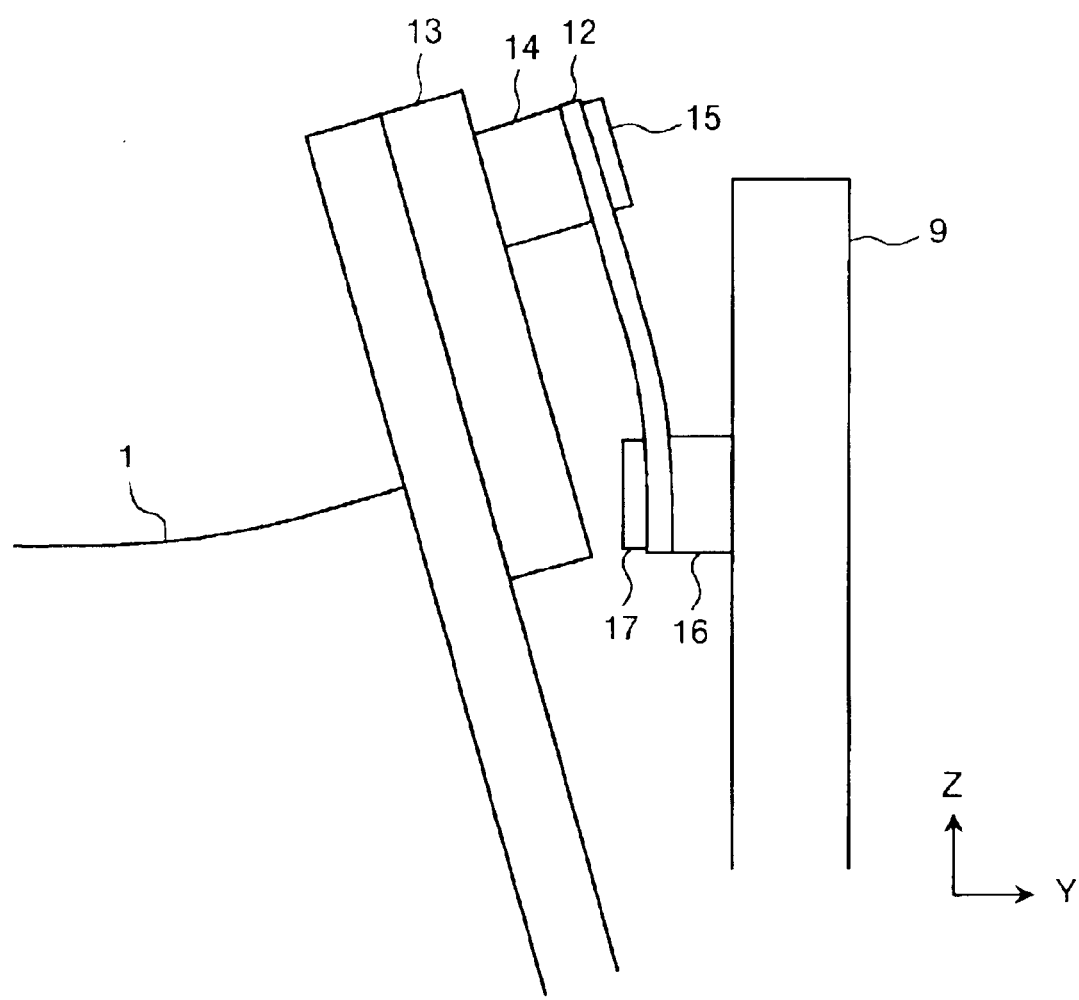
FIG. 8 is a diagram which shows the appearance of centrifugal distortion of the coupling member around the X axis.
Figure 9:
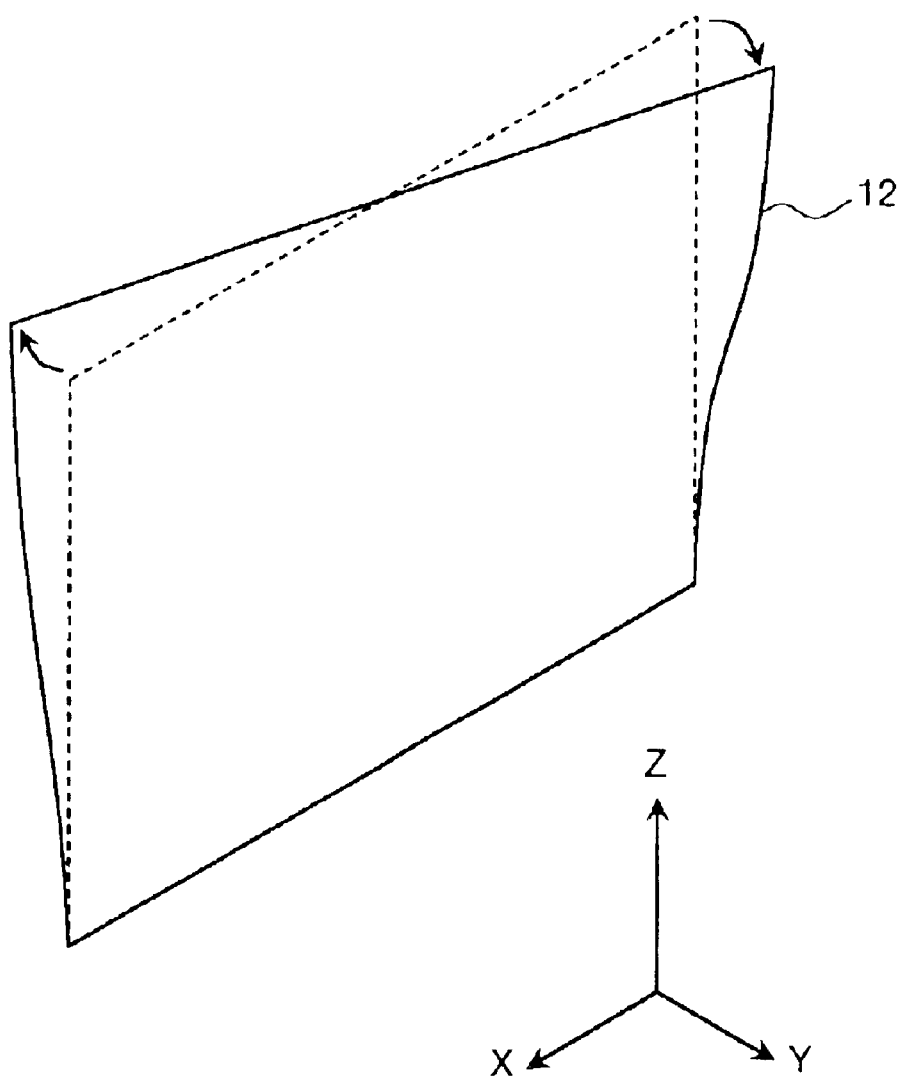
FIG. 9 is a diagram which shows the appearance of centrifugal distortion of the coupling member around the Z axis.

A first embodiment of this invention will be explained below. FIG. 1 is a perspective view which shows the whole of the first embodiment of the oscillator according to this invention, and FIG. 2 is a front view of the oscillator. FIG. 3 and FIG. 4 are schematic diagrams which show a specific state of the first embodiment of the oscillator. FIG. 3 is a diagram which shows the coupling state of a coupling member provided between an oscillator case and an optical base. FIG. 4 is a diagram which schematically shows the state of coupling the oscillator case and the optical bases by the coupling members. FIG. 5 and FIG. 6 are schematic views which show the thermally deformed oscillator case. FIG. 7 to FIG. 9 are diagrams which show the specific states of the coupling member when the oscillator case is thermally deformed. FIG. 7 and FIG. 8 are front view near the front optical base, and FIG. 9 is a perspective view which shows the appearance when the coupling member is deformed about the Z axis. In the explanation below, the direction of optical axis of the laser beam is designated as Y axis, the height direction perpendicular to the optical axis is designated as Z axis, and the direction perpendicular to the Y axis and the Z axis is designated as X axis.

The oscillator case 1 has a sealed structure in which a laser medium gas such as a $CO_2$ gas is sealed. Though not shown, a discharge electrode for generating the laser beam, a heat exchanger for cooling the laser medium gas, and a blower for circulating the laser medium gas are provided inside the oscillator case 1. End plates 18 and 28 are provided at the opposite ends of the oscillator case 1 in the direction of optical axis so as to protrude from the upper face of the oscillator case 1.

The rear optical base 7 and the front optical base 9 are disposed on the opposite sides of the oscillator case 1 in the direction of optical axis. The rear optical base 7 holds a total reflection mirror 6, and the front optical base 9 holds a partial reflection mirror 8 on the same optical axis as the total reflection mirror 6. These based 7 and 9 are disposed in parallel with each other by three supports rods 112 to 114, one in the lower part and two in the upper part. The rear optical base 7 holding the total reflection mirror 6 and the front optical base 9 holding the partial reflection mirror 8 constitute an optical resonator. The upper support rods 113 and 114 extend in the traveling direction of the laser beam (in the direction of optical axis), penetrating through the end plates 18 and 28 provided at the ends of the oscillator case 1. An example in which there are three support rods 112 to 114 will be explained below, but the number of the rods is not limited to three, and four or more support rods may be used.

The end plate 28 of the oscillator case 1 and the rear optical base 7 are connected by a bellow 10, and the end plate 18 of the oscillator case 1 and the front optical base 9 are connected by a bellow 11. The laser beam penetrates through these bellows 10 and 11.

The end plate 28 of the oscillator case 1 and the rear optical base 7 are also coupled by a coupling member 22, and the end plate 18 of the oscillator case 1 and the front optical base 9 are coupled by a coupling member 12 as well. By these coupling members 22 and 12, the central position of the bellows 10 and 11 on the side connected with the optical bases 7 and 9 restricts the degree of freedom in the direction of X axis (in the front and back direction in FIG. 2), in the direction of Z axis (in the height direction in FIG. 2), and in the rotation direction about the Y axis (optical axis of the laser beam in FIG. 2), with respect to the central position of the bellows 10 and 11 on the side connected with the end plates 28 and 18, but allows the movement in the direction of Y axis, in the direction of rotation about X axis, and in the direction of rotation about the Z axis other than the above directions.

The end plate 28 of the oscillator case 1 and the rear optical base 7, and the end plate 18 of the oscillator case 1 and the front optical base 9 can be respectively coupled by using rectangular plate springs 12 and 22 as the coupling members 12 and 22, in which the length in the direction of X axis is longer than the length in the direction of Z axis, and the thickness in the direction of Y axis is considerably small as compared to the length in the direction of X and Z axes (see FIG. 2 and FIG. 3). On the side of the optical base 9, the upper end portion of this plate spring 12 is fitted to the upper end portion of a plate spring support plate 13 fixed to the end plate 18 of the oscillator case 1, in the state clamped between a plate spring mount 14 and a plate spring fixing plate 15. The lower end portion of the plate spring 12 is fixed so as to be clamped between a plate spring mount 16 fitted to the front optical base 9 and a plate spring fixing plate 17. The end plate 18, the plate spring support plate 13, the plate spring mount 14, the plate spring 12, and the plate spring fixing plate 15 are fixed to each other by screwing or the like. The front optical base 9, the plate spring mount 16, the plate spring 12, and the plate spring fixing plate 17 are also fixed to each other by screwing. Though not explained, on the side of the rear optical base 7, a spring plate 22 is coupled between the rear optical base 7 and the end plate 28 of the oscillator case 1 in the same manner as explained above.

In this manner, by coupling the oscillator case 1 and the optical bases 7 and 9 via the plate springs 12 and 22, the construction of the optical resonator constituted by the front optical base 9 and the rear optical base 7 becomes equal to the state obtained by hanging the optical resonator from the upper end portion of the oscillator case 1 by the plate springs 12 and 22, as shown in FIG. 4. That is, the optical resonator easily deforms with respect to bending in the direction of Y axis and with respect to the direction of rotation about X axis or Z axis, while the optical resonator is hard to deform with respect to bending in the direction of X axis or Z axis and has high rigidity with respect to the rotation direction about the Y axis.

The oscillator case 1 extends in the direction of optical axis (in the direction of Y axis) by the heat of the laser medium gas during the operation thereof, and thermally deforms so as to curve based on the temperature distribution of the laser medium gas. For example, when the thermally deformed oscillator case 1 is viewed from the above, as shown in FIG. 5, the oscillator case 1 deforms such that it elongates in the direction of optical axis (in the direction of Y axis) than the original length, and the rear side of the oscillator case 1 largely expands as compared to the front side thereof so as to curve along the Y axis (so as to rotate about the Z axis). When the thermally deformed oscillator case 1 is viewed from the front, as shown in FIG. 6, the oscillator case 1 elongates in the direction of optical axis (in the direction of Y axis) than the original length, and the lower side of the oscillator case 1 largely expands as compared to the upper side thereof so as to curve along the Y axis (so as to rotate about the X axis). The rectangle shown by a dotted line in FIG. 5 and FIG. 6 indicates the shape of the oscillator case 1 before being deformed.

With the thermal deformation of the oscillator case 1 as shown in FIG. 5 and FIG. 6, each position of the bellows 10 and 11 fitted to the opposite ends of the oscillator case 1 also changes. Generally, the rigidity of the bellows 10 and 11 in the deviation direction of the core is very large as compared to the axial rigidity. Hence, a harmful reaction force occurs by the positional displacement of the bellows 10 and 11. That is, the structure of the optical resonator connected to the bellows 10 and 11 deforms due to this reaction force, and the positions of the two optical bases 7 and 9 are shifted.

In this first embodiment, with respect to the thermal deformation of the oscillator case 1 which acts so as to destroy the parallel positional relation at the opposite ends of the oscillator case 1, the two optical bases 7 and 9 are coupled to the opposite ends of the oscillator case 1 via the plate springs 22 and 12. As a result, the two optical bases 7 and 9 do not undergo the deformation force due to the thermal deformation of the oscillator case 1. That is, as shown in FIG. 7, with respect to the deformation due to the elongation of the oscillator case 1 in the direction of Y axis, the plate springs 12 and 22 deform so as to absorb the elongation of the oscillator case 1. Since the reaction force caused by the deformation of the plate springs 12 and 22 at this time is very small, the force which affects the optical bases 7 and 9 is small. As a result, the parallelism between the two optical bases 7 and 9 can be maintained. The curve of the oscillator case 1 along the Y axis in the Y-Z plane as shown in FIG. 6 is absorbed by the plate springs 12 (22) deforming so as to warp about the X axis, as shown in FIG. 8. In this case, also, the reaction force caused by the deformation of the plate springs 12 (22) is very small, and therefore a large force which deforms the optical bases 7 and 9 is not applied. Further, the curve of the oscillator case 1 along the Y axis in the X-Y plane as shown in FIG. 5 is absorbed by the plate springs 12 and 22 deforming so as to twist about the Z axis, as shown in FIG. 9. Hence, such a large force as that the optical bases 7 and 9 are deformed is not applied.

The plate springs 12 and 22 make the central position of the bellows on the side of the optical bases 9 and 7 restrict the degree of freedom in the direction of X axis, Z axis, and in the direction of rotation about Y axis, with respect to the central position of the bellows 11 and 10 on the end faces of the oscillator case 1 in the direction of optical axis. Therefore, imperfect alignment deformation due to positional displacement of the bellows 11 and 10 with the thermal deformation of the oscillator case 1 does not occur, and hence occurrence of a harmful deformation force with respect to the optical bases 9 and 7 can be suppressed.

In this first embodiment, since the upper ends of the plate springs 12 and 22 are supported on the oscillator case 1 and the lower ends thereof are supported on the optical base 7 and 9, a force due to the mass of the optical bases 7 and 9 in the direction of gravity acts on the plate springs 12 and 22 at all times. By this force, a tensile stress is produced on the plate springs 12 and 22 as a stress. Thereby, the thickness of the plate springs 12 and 22 in the direction of Y axis can be reduced. That is, it becomes possible to enhance the rigidity of the plate springs 12 and 22 with respect to the bending in the direction of X axis and Z axis and to the rotation about Y axis, and to largely reduce the rigidity with respect to the bending in the direction of Y axis, and the rotation about X axis and Z axis.

As described above, in the orthogonally excited-type laser oscillator having a construction such that the two optical bases 7 and 9 constituting the optical resonator are strongly fixed on the opposite ends of the oscillator case 1, when the oscillator case 1 is deformed due to heat, the two optical bases 7 and 9 follow the deformation of the oscillator case 1 to thereby undergo the deformation force, and as a result, the parallelism of the two optical bases 7 and 9 is lost. According to this first embodiment, however, the plate springs 12 and 22 as a coupling member absorb the deformation of the oscillator case 1, and do not transmit the deformation to the optical bases 7 and 9. Hence, the positional relation between the two optical bases 7 and 9 can be maintained. Further, according to this first embodiment, the plate springs 12 and 22 can suppress a harmful deformation force acting on the two optical bases 7 and 9, caused by the imperfect alignment deformation of the bellows 11 and 10. As a result, the laser optical axis of the laser beam can be kept constant.

Figure 10:
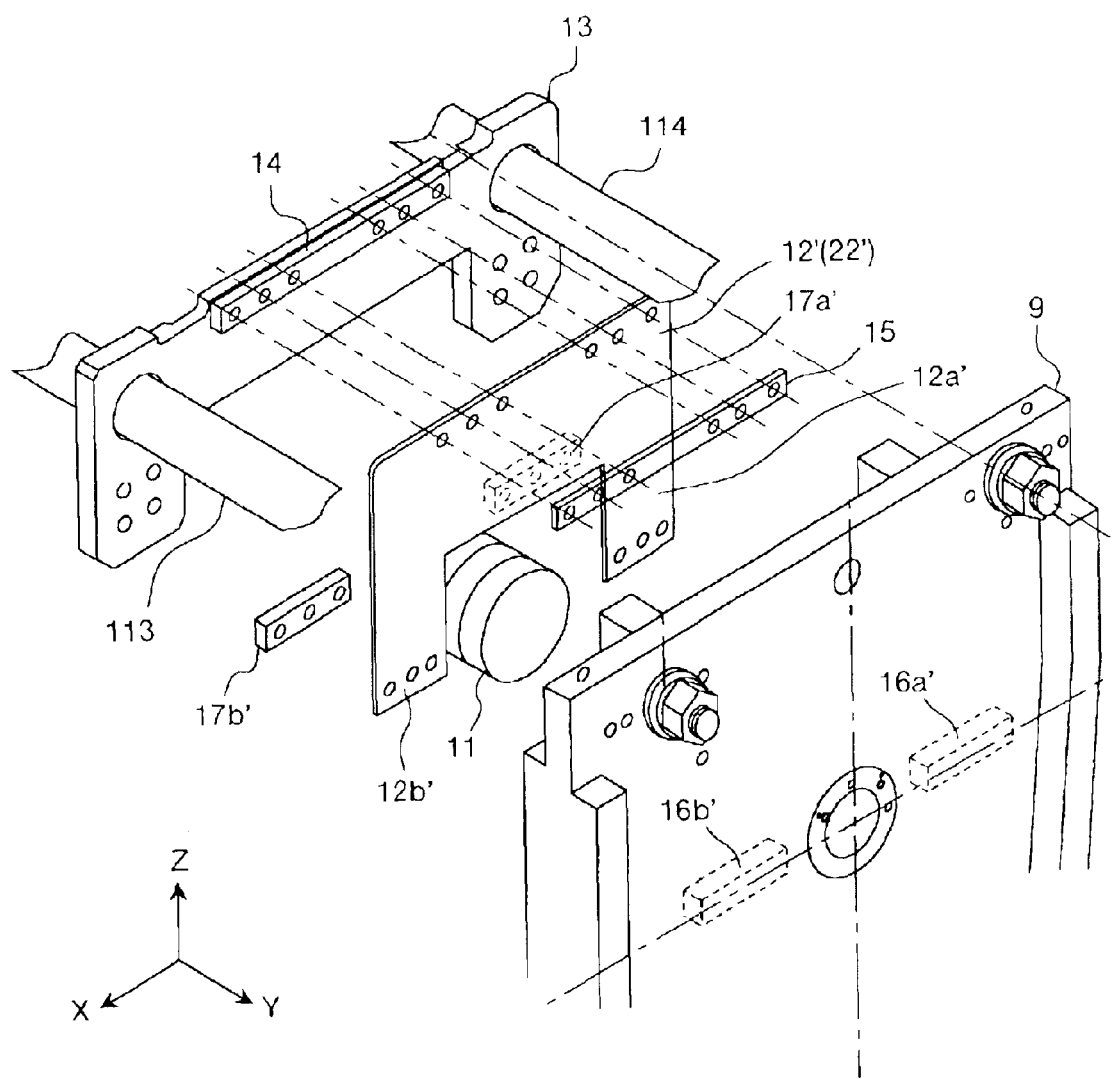
FIG. 10 is a diagram which shows the positional relation between the coupling member and bellows in an orthogonally excited-type laser oscillator according to a second embodiment of this invention.

A second embodiment of this invention will be explained below. FIG. 10 is a diagram which shows the second embodiment of the orthogonally excited-type laser oscillator according to this invention, in which a plate spring in a "U" shape is used as the plate spring 12 (22) which functions as the coupling member. FIG. 10 shows a situation of how a plate spring 12' which couples the oscillator case 1 to the front optical base 9 is fitted. In this figure, the same reference symbol is assigned to the same constituent of the first embodiment, and the explanation thereof is omitted.

In the first embodiment, the rectangular plate spring 12 (22) has been mentioned as an example, in which the length in the direction of X axis is longer than the length in the direction of Z axis. However, in this second embodiment, the U-shaped plate spring 12' (22') is used as the coupling member.

This U-shaped plate spring 12' is arranged with legs 12a' and 12b' facing downwards of the Z axis so as to clamp the bellow 11 (10) between the legs 12a' and 12b'. That is, on the side of the front optical base 9, the upper end portion of the plate spring 12' is fitted to the upper end portion of the plate spring support plate 13 which is fixed to the end plate 18 of the oscillator case 1 so as to be clamped between the plate spring mount 14 and the plate spring fixing plate 15. The two legs 12a' and 12b' of the plate spring 12' are fixed so as to be clamped between the plate spring mounts 16a' and 16b', respectively fitted to the front optical base 9, and the plate spring fixing plates 17a' and 17b'. However, the positions of the legs 12a' and 12b' of the plate spring 12' fixed by the plate spring mounts 16a' and 16b' and the plate spring fixing plates 17a' and 17b' are at the same height as that of the central position of the bellows 11.

As described above, the U-shaped plate spring 12' (22') easily deforms in the direction about the Z axis, due to the shape and the arrangement method, as compared to the rectangular plate spring 12 (22) in the first embodiment. That is, it becomes possible to efficiently absorb the deformation in the direction of rotation about the Z axis.

According to this second embodiment, since the U-shaped plate springs 12' and 22' are used as the coupling member, torsional deformation of the plate springs 12' and 22' about the Z axis easily occurs, thereby the deformation reaction force of the plate springs 12' and 22' can be further reduced. As a result, the influence due to the thermal deformation of the oscillator case 1 and the influence due to the imperfect alignment deformation of the bellows 10 and 11 because of this do not affect the two optical bases 7 and 9 constituting the optical resonator.

Figure 11:
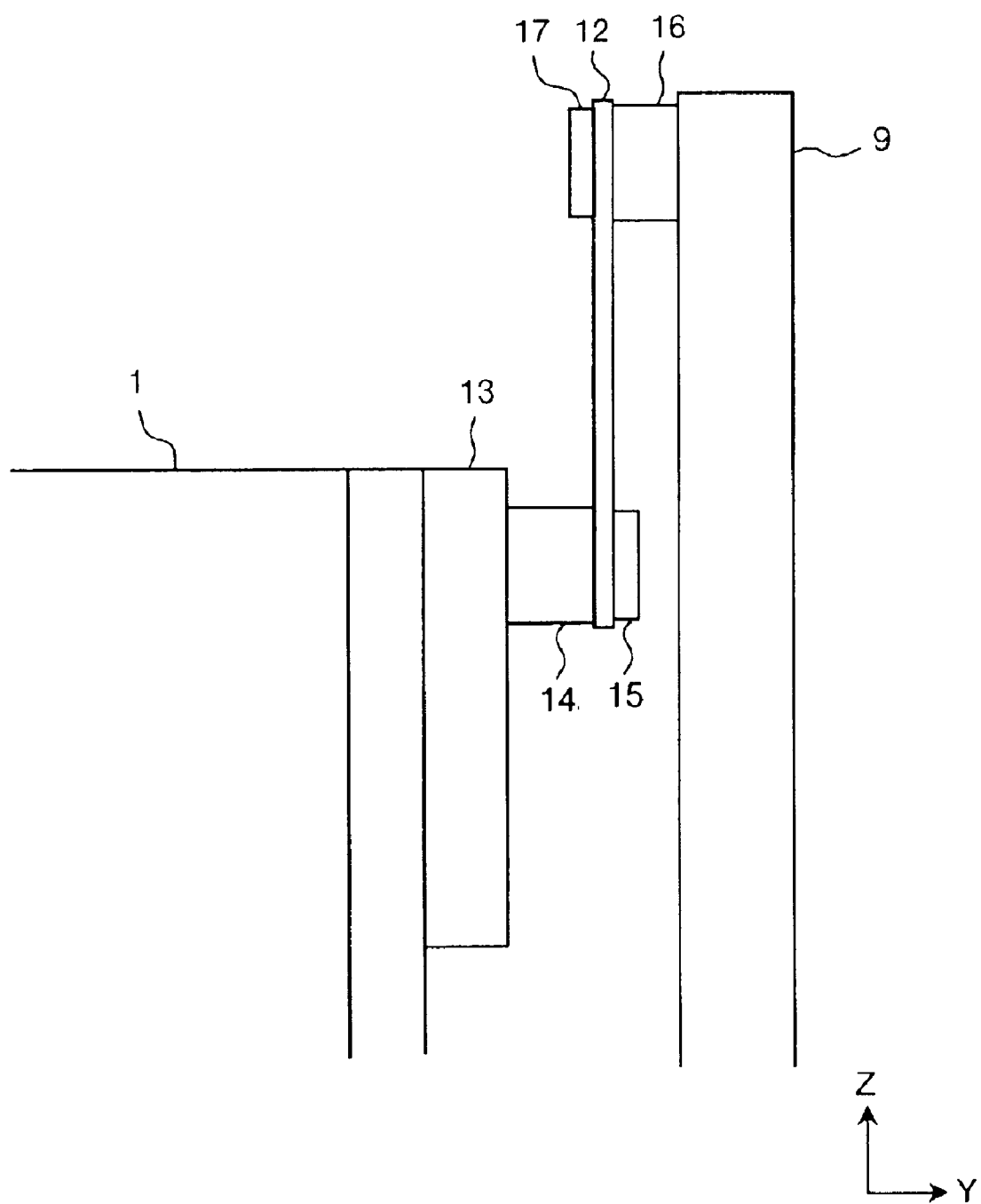
FIG. 11 is a diagram which shows the position of the coupling member in an orthogonally excited-type laser oscillator according to a third embodiment of this invention.
Figure 12:
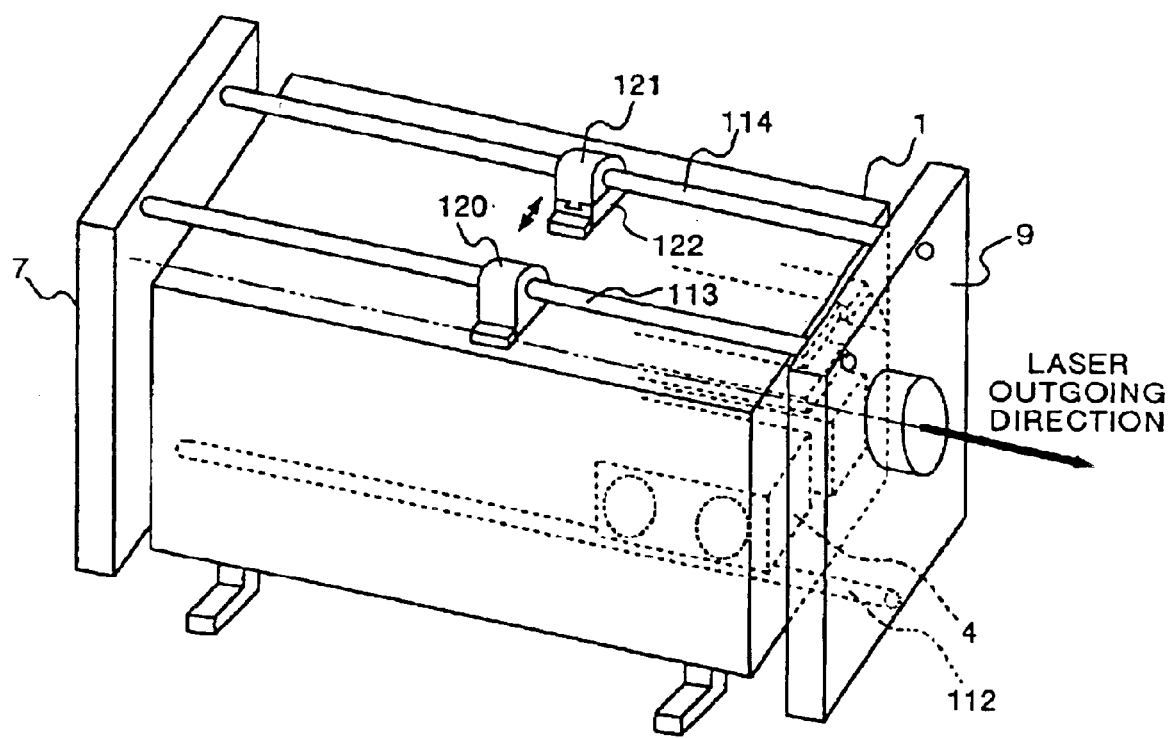
FIG. 12 is a perspective view which shows the conventional example of the orthogonally excited-type laser oscillator.

A third embodiment of this invention will be explained below. FIG. 11 is a diagram which shows the third embodiment of the orthogonally excited-type laser oscillator according to this invention, and which shows a front view in the connecting portion between the oscillator case 1 and the front optical base 9. In the above first embodiment, the upper end portions of the plate springs 12 and 22 are coupled to the oscillator case 1, and the lower end portions thereof are coupled to the optical base 7 and 9. However, this third embodiment shows an opposite example to that of the first embodiment, as shown in FIG. 11. That is, the upper end portions of the plate springs 12 and 22 are coupled to the optical base 7 and 9, and the lower end portions thereof are coupled to the oscillator case 1.

In other words, on the side of the front optical base 9, the lower end portion of the plate spring 12 is fitted to the upper end portion of the plate spring support plate 13 which is fixed to the side end of the oscillator case 1 in the direction of optical axis so as to be clamped between the plate spring mount 14 and the plate spring fixing plate 15. The upper end portion of the plate spring 12 is also fixed so as to be clamped between the plate spring mount 16 and the plate spring fixing plate 17. The side end of the oscillator case 1, the plate spring support plate 13, the plate spring mount 14, the plate spring 12, and the plate spring fixing plate 15 are fixed to each other by screwing. The front optical base 9, the plate spring mount 16, the plate spring 12, and the plate spring fixing plate 17 are also fixed to each other by screwing. Though not explained, on the side of the rear optical base 7, the upper end portion of the plate spring 22 is coupled to the rear optical base 7, and the lower end portion thereof is coupled to the end plate 28 of the oscillator case 1 in the same manner as explained above.

According to this third embodiment, since the construction is such that the coupling position of the plate springs 12 and 22 with respect to the oscillator case 1 is made lower than the coupling position thereof with respect to the optical base 7 and 9 sides, the plate spring 12 or 22 undergoes the gravity of the optical base 9 or 7, and hence it is necessary to increase the plate thickness of the plate springs 12 and 22 to the level sufficient for preventing buckling of the plate springs 12 and 22. However, it becomes possible to make the assembly structure of the orthogonally excited-type laser oscillator simpler as compared to the first embodiment.

According to the orthogonally excited-type laser oscillator of the invention, the coupling members each of which couples the side end of the oscillator case in the optical axis to each optical base are provided, so that when the direction of optical axis of the optical resonator is Y axis, the height direction perpendicular to the direction of optical axis is Z axis, and the direction perpendicular to the Y axis and the Z axis is X axis, each central position of the bellows connected to the optical bases restricts a bending movement in the directions of the X axis and the Z axis and the rotation about the Y axis, with respect to each central position of the bellows connected to the side ends of the oscillator case, but allows a bending movement in the direction of Y axis and a rotation about the X axis and Z axis. Therefore, the coupling m can absorb the force due to a thermal deformation of the oscillator case and an imperfect alignment deformation of the bellows. The positional relation between the two optical bases (parallelism and imperfect alignment) can be kept in the initial state, thereby it is possible to keep the quality (output, beam mode) of the laser beam stable.

Moreover, since the coupling member is constituted by the plate spring, that the plate spring can effectively absorb the force due to a thermal deformation of the oscillator case and an imperfect alignment deformation of the bellows. As a result, the positional relation between the two optical bases (parallelism and imperfect alignment) can be kept in the initial state. Further, when the deformation between the optical bases is prevented by a guide mechanism such as a linear bearing, a stick slip due to a frictional force occurs with respect to a minute deformation, and a harmful deformation occurs in the optical bases. However, when a guide mechanism formed of the plate spring is used, no frictional force occur, and hence such a stick slip does not occur. Therefore, the guide mechanism formed of the plate spring can be constructed at a low cost as compared to the guide mechanism such as the linear bearing.

Furthermore, since the coupling member is constituted by the U-shaped plate spring, a torsional deformation easily occurs about the Z axis of the plate spring, and hence the deformation reaction force of the plate spring can be further reduced. As a result, the influence due to the thermal deformation of the oscillator case and the influence due to the imperfect alignment deformation of the bellows because of this do not affect the two optical bases constituting the optical resonator.

Moreover, the upper end portion of the plate spring is supported on the side end of the oscillator case, and the lower end thereof is supported on the optical base side. Therefore, a tensile stress occurs in the plate spring due to the gravity of the mass of the optical base, and hence the thickness of the plate spring in the direction of Y axis can be reduced.

Furthermore, the lower end of the plate spring is supported on the side end of the oscillator case, and the upper end thereof is supported on the optical base. Therefore, the assembly structure of the orthogonally excited-type laser oscillator can be made simple.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An orthogonally excited-type laser oscillator comprising:
    an oscillator case;
    a pair of optical bases which are installed on opposite sides of the oscillator case and connected parallel with each other by at least three support rods extending in a direction of optical axis, and which respectively support optical parts constituting an optical resonator;
    a pair of bellows which connect the pair of optical bases with the oscillator case; and
    coupling members each of which couples a side end of the oscillator case to one of the optical bases when the direction of optical axis of the optical resonator is Y axis, a height direction perpendicular to the direction of optical axis is Z axis, and a direction perpendicular to the Y axis and the Z axis is X axis, wherein
    each coupling member is configured to restrict a bending movement in the directions of X axis and Z axis and a rotation about the Y axis and to allow a bending movement in the direction of the Y axis and a rotation movement about the X axis and Z axis, the bending and rotation movements being those of each center of sides of the bellows connected to the optical bases with respect to a corresponding one of centers of sides of the bellows connected to the side end of the oscillator case.

2. The orthogonally excited-type laser oscillator according to claim 1, wherein an upper end portion of each coupling member is supported by the side end of the oscillator case, and a lower end portion thereof is supported by the optical base.

3. The orthogonally excited-type laser oscillator according to claim 1, wherein a lower end portion of each coupling member is supported by the side end of the oscillator case, and an upper end portion thereof is supported by the optical base.

4. The orthogonally excited-type laser oscillator according to claim 1, wherein each coupling member has a "U" shape.

5. The orthogonally excited-type laser oscillator according to claim 4, therein the each coupling member with the "U" shape is constituted by a plate spring.

6. The orthogonally excited-type laser oscillator according to claim 1, wherein each coupling member is constituted by a plate spring.

7. The orthogonally excited-type laser oscillator according to claim 6, wherein the plate spring has a rectangular shape.

8. The orthogonally excited-type laser oscillator according to claim 7, wherein a length of the plate spring in the direction of X axis is longer than a length in the direction of Z axis thereof.

* * * * *